US009016358B2

(12) United States Patent
Fieback et al.

(10) Patent No.: US 9,016,358 B2
(45) Date of Patent: Apr. 28, 2015

(54) SYSTEM FOR HEATING AND COOLING AMBIENT AIR IN A ROOM OF A BUILDING

(75) Inventors: Klaus Fieback, Michendorf (DE);
Andreas Laube, Fürstenwalde (DE);
Lutz Kutzker, Rauen (DE); Harald Kuhlei, Glücksburg-Meierwik (DE);
Antonius Hubertus Henricus Schmitz, CT Posterholt (NL)

(73) Assignee: Autarkis B.V., Na Almere (NL)

( * ) Notice: Subject to any disclaimer, the term of this patent is extended or adjusted under 35 U.S.C. 154(b) by 792 days.

(21) Appl. No.: 13/097,586

(22) Filed: Apr. 29, 2011

(65) Prior Publication Data

US 2011/0198053 A1  Aug. 18, 2011

Related U.S. Application Data

(62) Division of application No. 10/517,124, filed as application No. PCT/EP03/05796 on Jun. 3, 2003, now Pat. No. 7,934,543.

(30) Foreign Application Priority Data

Jun. 3, 2002 (DE) .................. 102 24 656
Aug. 29, 2002 (DE) .................. 102 39 785
May 13, 2003 (DE) .................. 103 21 646

(51) Int. Cl.
*F24D 11/00* (2006.01)
*F28D 17/00* (2006.01)
(Continued)

(52) U.S. Cl.
CPC *C08J 9/40* (2013.01); *C08J 9/0009* (2013.01); *F24F 1/01* (2013.01); *F24F 5/0017* (2013.01); *F24F 5/0021* (2013.01); *F24F 12/006* (2013.01); *F24F 2005/0025* (2013.01); *F24F 2012/007* (2013.01); *F24F 2221/28* (2013.01); *F28D 20/02* (2013.01); *Y02B 30/16* (2013.01); *Y02E 60/145* (2013.01); *Y02E 60/147* (2013.01);
(Continued)

(58) Field of Classification Search
CPC ....... F28D 20/00; F28D 20/02; F28D 20/021; F28D 20/023; F28D 20/025; F28D 20/026; F28D 20/028; F28D 20/056; F28D 21/0014; Y02E 60/142; Y02E 60/145; Y02E 60/147
USPC .................................. 165/10, 236
See application file for complete search history.

(56) References Cited

U.S. PATENT DOCUMENTS 2,808,494 A * 10/1957 Telkes ........................ 237/2 R
2,835,483 A    5/1958 Lindsay
(Continued)

FOREIGN PATENT DOCUMENTS

DE    2712943    9/1978
DE    19813562   11/1998
(Continued)

*Primary Examiner* — Ljiljana Ciric
(74) *Attorney, Agent, or Firm* — Lucas & Mercanti, LLP; Klaus P. Stoffel

(57) ABSTRACT

A system for conditioning ambient air in a room of a building in terms of heat and/or cold and optionally humidity, where air flow is accomplished by latent heat accumulator bodies arranged in the room of the building. A separate air duct, which forms an incoming-air flow, is provided to blow out incoming air underneath the latent heat accumulator bodies, while air is sucked in parallel to the surface of the latent heat accumulator bodies.

8 Claims, 12 Drawing Sheets

US 9,016,358 B2

Page 2

(51) Int. Cl.
| | |
|---|---|
| *F28D 19/00* | (2006.01) |
| *C08J 9/40* | (2006.01) |
| *C08J 9/00* | (2006.01) |
| *F24F 1/01* | (2011.01) |
| *F24F 5/00* | (2006.01) |
| *F24F 12/00* | (2006.01) |
| *F28D 20/02* | (2006.01) |
| *F24F 7/00* | (2006.01) |

(52) U.S. Cl.
CPC .......... *F24F 2007/004* (2013.01); *Y02B 30/563* (2013.01)

(56) References Cited

U.S. PATENT DOCUMENTS

| | | | | | |
|---|---|---|---|---|---|
| 3,254,702 | A | * | 6/1966 | Thomason | 165/48.2 |
| 3,295,591 | A | * | 1/1967 | Thomason | 165/122 |
| 3,369,541 | A | * | 2/1968 | Thomason | 165/10 |
| 3,780,262 | A | * | 12/1973 | Rudd | 165/236 |
| 3,878,888 | A | * | 4/1975 | Seidl | 165/128 |
| 3,893,506 | A | | 7/1975 | Laing | |
| 3,955,554 | A | * | 5/1976 | Collie | 165/104.31 |
| 3,977,197 | A | * | 8/1976 | Brantley, Jr. | 165/10 |
| 3,983,929 | A | * | 10/1976 | Thomason et al. | 165/48.2 |
| 3,989,927 | A | * | 11/1976 | Erb | 165/10 |
| 4,000,851 | A | * | 1/1977 | Heilemann | 165/236 |
| 4,003,426 | A | | 1/1977 | Best et al. | |
| 4,024,910 | A | * | 5/1977 | Werner | 165/45 |
| 4,029,082 | A | * | 6/1977 | Thomason et al. | 126/592 |
| 4,037,583 | A | * | 7/1977 | Bakun et al. | 237/1 R |
| 4,051,891 | A | * | 10/1977 | Harrison | 165/54 |
| 4,081,024 | A | * | 3/1978 | Rush et al. | 165/62 |
| 4,108,374 | A | * | 8/1978 | Lyon et al. | 126/590 |
| 4,127,973 | A | * | 12/1978 | Kachadorian | 126/400 |
| 4,129,116 | A | * | 12/1978 | Kent | 126/632 |
| 4,138,995 | A | * | 2/1979 | Yuan | 126/400 |
| 4,147,204 | A | * | 4/1979 | Pfenninger | 165/4 |
| 4,170,982 | A | * | 10/1979 | Gottier | 126/99 A |
| 4,193,543 | A | * | 3/1980 | Viesturs et al. | 126/400 |
| 4,194,496 | A | * | 3/1980 | Carlson | 165/10 |
| 4,201,192 | A | * | 5/1980 | Coxon et al. | 126/585 |
| 4,203,489 | A | * | 5/1980 | Swiadek | 165/10 |
| 4,210,201 | A | * | 7/1980 | O'Hanlon | 165/10 |
| 4,222,365 | A | * | 9/1980 | Thomson | 126/400 |
| 4,234,782 | A | * | 11/1980 | Barabas et al. | 165/10 |
| 4,240,268 | A | * | 12/1980 | Yuan | 165/10 |
| 4,240,404 | A | * | 12/1980 | Franchina | 165/10 |
| 4,241,782 | A | * | 12/1980 | Schoenfelder | 165/10 |
| 4,250,866 | A | * | 2/1981 | Telkes | 165/10 |
| 4,250,885 | A | * | 2/1981 | van Heel | 126/400 |
| RE30,540 | E | * | 3/1981 | Lyon et al. | 126/400 |
| 4,259,401 | A | * | 3/1981 | Chahroudi et al. | 165/10 |
| 4,270,512 | A | * | 6/1981 | Van Der Maas | 126/400 |
| 4,286,141 | A | * | 8/1981 | MacCracken | 165/10 |
| 4,286,574 | A | * | 9/1981 | Vrolyk et al. | 126/400 |
| 4,287,942 | A | * | 9/1981 | Whitman | 165/10 |
| 4,303,058 | A | * | 12/1981 | Chun | 126/620 |
| 4,305,381 | A | * | 12/1981 | Misrahi et al. | 165/10 |
| 4,321,962 | A | * | 3/1982 | Doty | 165/236 |
| 4,323,113 | A | * | 4/1982 | Troyer | 165/45 |
| 4,324,289 | A | * | 4/1982 | Lahti | 165/10 |
| 4,346,569 | A | * | 8/1982 | Yuan | 165/10 |
| 4,355,627 | A | * | 10/1982 | Scarlata | 126/400 |
| 4,383,521 | A | * | 5/1983 | Bounds | 126/616 |
| 4,384,569 | A | * | 5/1983 | Clearman et al. | 126/617 |
| 4,392,480 | A | * | 7/1983 | Vautrin | 126/400 |
| 4,398,590 | A | * | 8/1983 | Leroy | 165/10 |
| 4,405,010 | A | * | 9/1983 | Schwartz | 165/4 |
| 4,411,255 | A | * | 10/1983 | Lee | 126/618 |
| 4,440,343 | A | * | 4/1984 | Bergeron, Jr. | 126/400 |
| 4,452,229 | A | * | 6/1984 | Powers | 126/400 |
| 4,482,010 | A | | 11/1984 | Cordon | |
| 4,538,507 | A | * | 9/1985 | Bergeron, Jr. | 126/400 |
| 4,541,479 | A | * | 9/1985 | Bergeron, Jr. | 165/45 |
| 4,556,100 | A | * | 12/1985 | Whitman | 165/10 |
| 4,602,676 | A | * | 7/1986 | Bergeron, Jr. | 165/45 |
| 4,651,805 | A | * | 3/1987 | Bergeron, Jr. | 165/45 |
| 4,699,206 | A | * | 10/1987 | Kirchmeier | 165/10 |
| 4,709,750 | A | * | 12/1987 | White | 165/10 |
| 4,754,806 | A | * | 7/1988 | Astle, Jr. | 165/10 |
| 4,781,243 | A | | 11/1988 | DeVogel et al. | |
| 4,815,522 | A | * | 3/1989 | Thunberg | 165/4 |
| 4,901,789 | A | * | 2/1990 | Hengelmolen | 165/4 |
| 4,903,757 | A | * | 2/1990 | Berendt | 165/10 |
| 4,919,245 | A | * | 4/1990 | Braden | 165/10 |
| 4,922,998 | A | * | 5/1990 | Carr | 165/10 |
| 5,005,556 | A | * | 4/1991 | Astle, Jr. | 165/10 |
| 5,029,450 | A | | 7/1991 | Takano et al. | |
| 5,038,850 | A | * | 8/1991 | Choi | 165/10 |
| 5,054,540 | A | * | 10/1991 | Carr | 165/10 |
| 5,056,588 | A | * | 10/1991 | Carr | 165/10 |
| 5,088,471 | A | * | 2/1992 | Bottum | 126/628 |
| 5,165,466 | A | * | 11/1992 | Arbabian | 165/4 |
| 5,191,930 | A | * | 3/1993 | Chaney | 165/10 |
| 5,228,504 | A | * | 7/1993 | Mantegazza et al. | 165/10 |
| 5,277,038 | A | * | 1/1994 | Carr | 165/10 |
| 5,423,187 | A | | 6/1995 | Fournier | |
| 5,553,662 | A | * | 9/1996 | Longardner et al. | 165/236 |
| 5,590,705 | A | * | 1/1997 | Chevalier et al. | 165/10 |
| 5,770,295 | A | | 6/1998 | Alderman | |
| 6,062,296 | A | | 5/2000 | Broberg | |
| 6,105,659 | A | * | 8/2000 | Pocol et al. | 165/10 |
| 6,302,188 | B1 | * | 10/2001 | Ruhl et al. | 165/10 |
| 6,393,861 | B1 | * | 5/2002 | Levenduski et al. | 165/10 |
| 7,934,543 | B2 | * | 5/2011 | Fieback et al. | 165/236 |
| 2002/0112845 | A1 | * | 8/2002 | Hirano | 165/10 |
| 2004/0045700 | A1 | * | 3/2004 | Matsubara | 165/48.2 |
| 2004/0194914 | A1 | * | 10/2004 | Johnson et al. | 165/45 |
| 2004/0216479 | A1 | * | 11/2004 | Boissevain | 62/260 |
| 2009/0217526 | A1 | * | 9/2009 | Mittelbach et al. | 29/890.03 |

FOREIGN PATENT DOCUMENTS

| | | | |
|---|---|---|---|
| DE | 10102250 | 1/2002 | |
| DE | 19836048 | 1/2002 | |
| DE | 10107145 | 9/2002 | |
| DE | 20208898 | 10/2002 | |
| EP | 074612 | 3/1983 | |
| EP | 0834705 Y | 4/1998 | |
| EP | 0791163 | 11/1998 | |
| GB | 2237629 A * | 5/1991 | F24H 7/02 |
| JP | 2002195770 | 7/2002 | |
| WO | 9614550 | 5/1996 | |
| WO | 9924760 | 5/1999 | |
| WO | 0011424 | 3/2000 | |
| WO | 0045094 Y | 8/2000 | |
| WO | 0138810 | 5/2001 | |

* cited by examiner

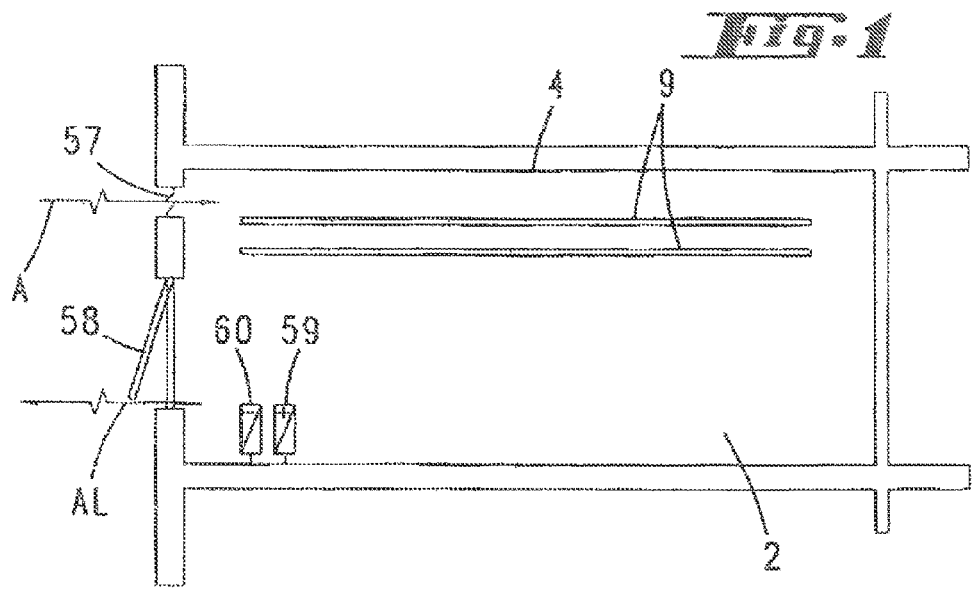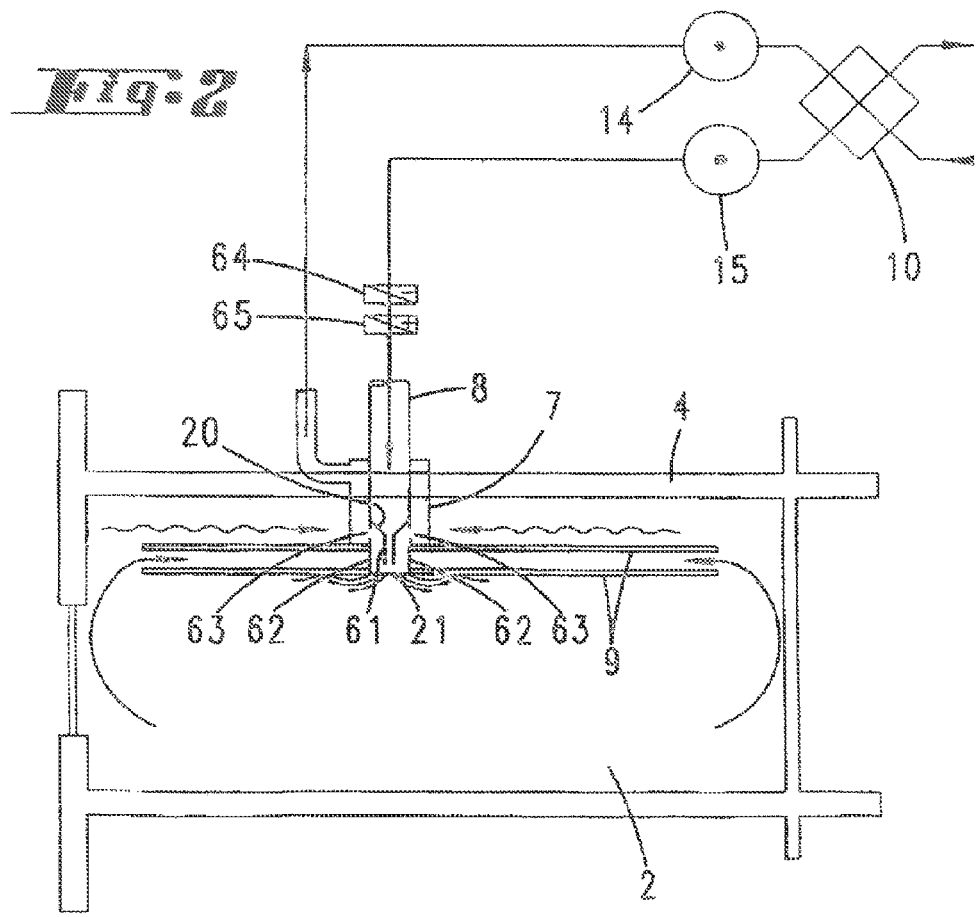

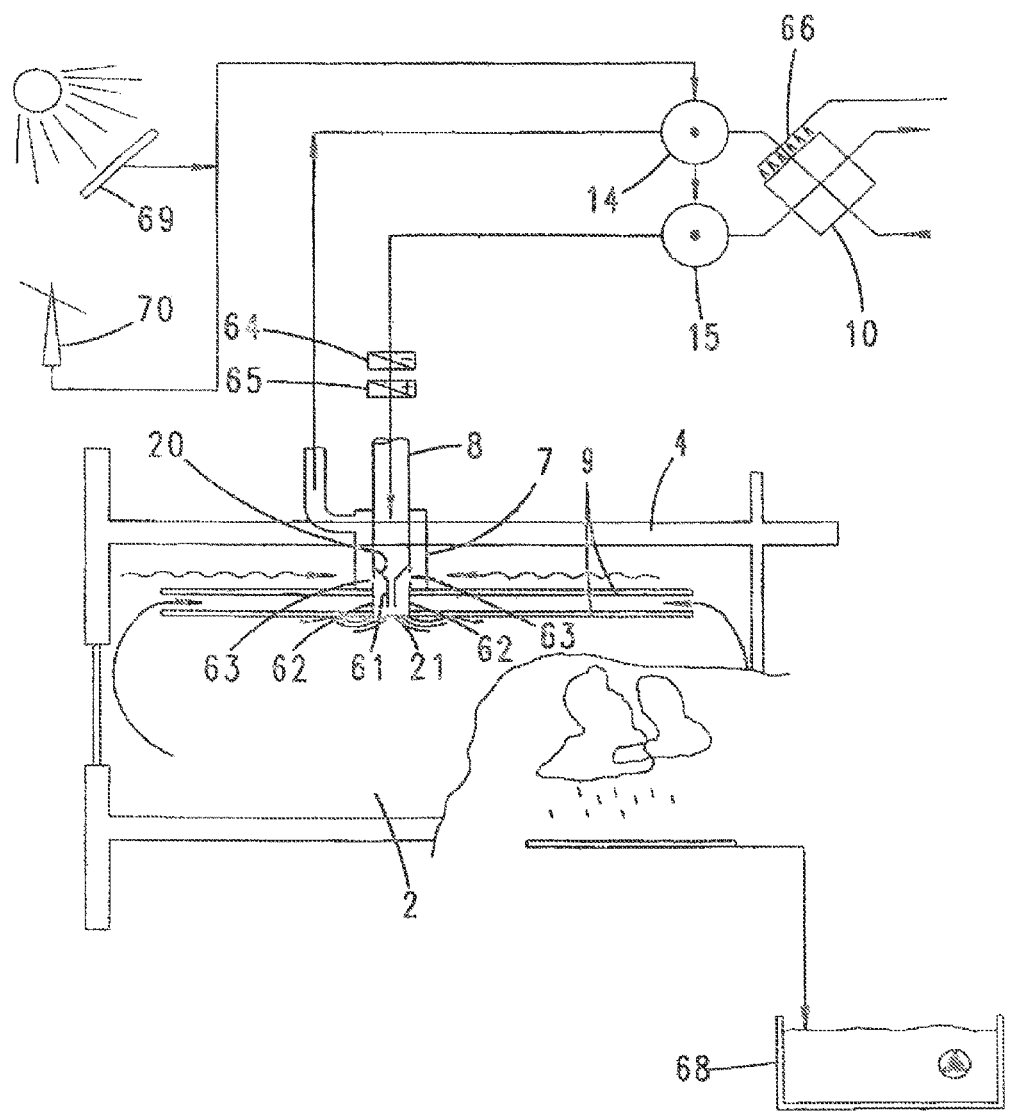

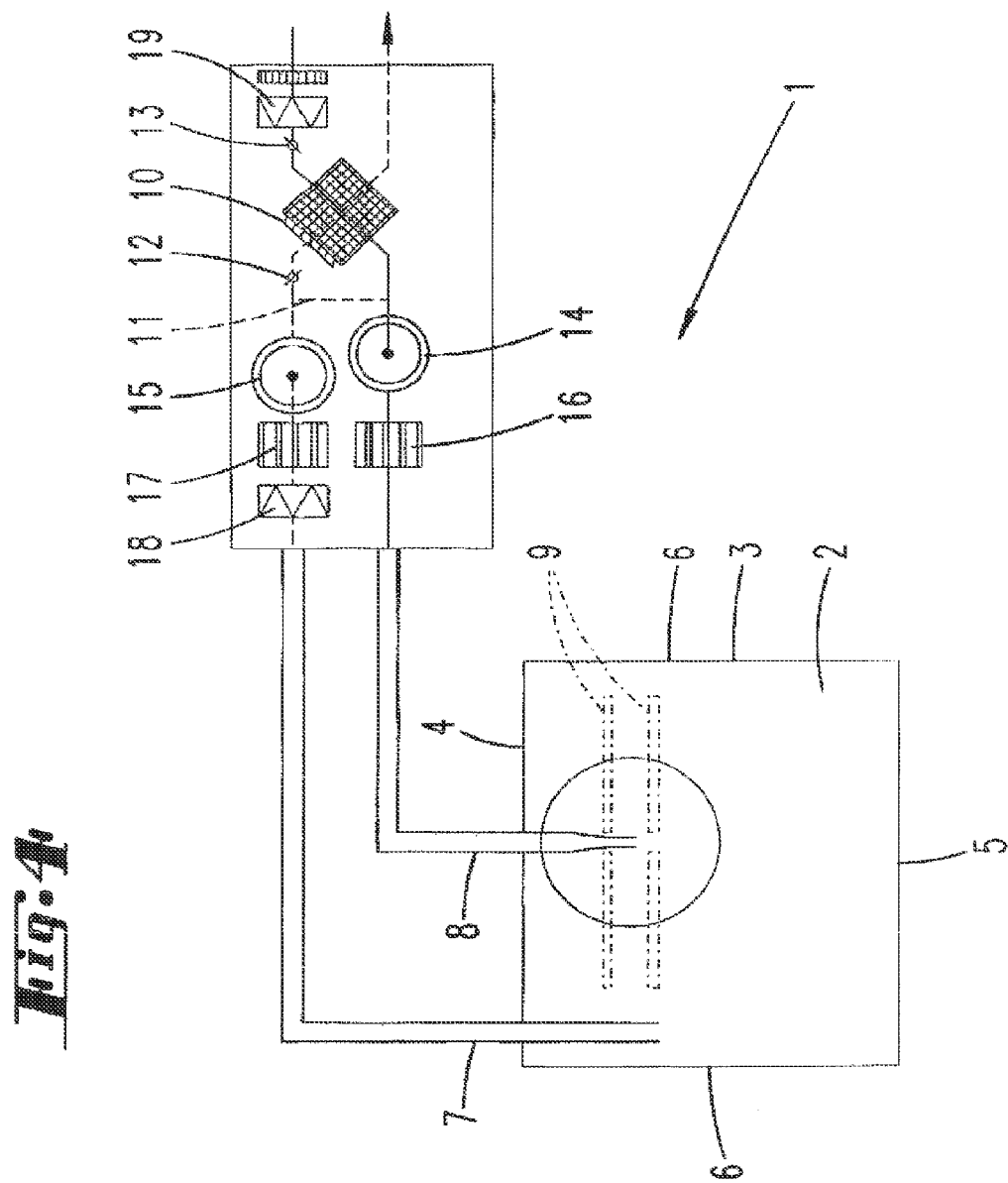

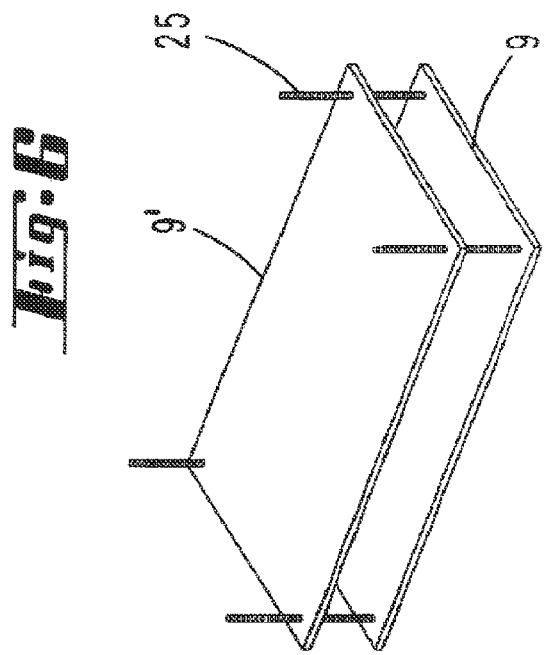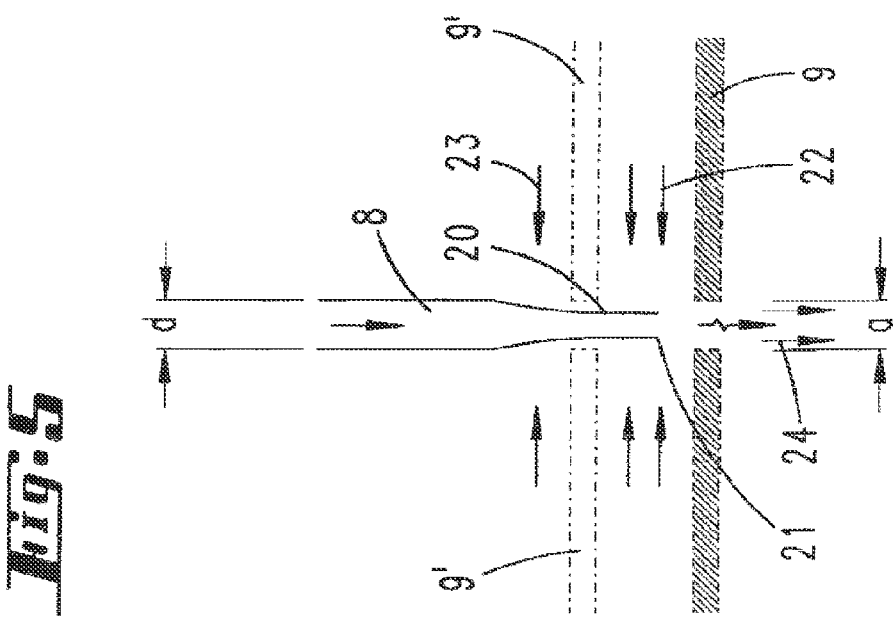

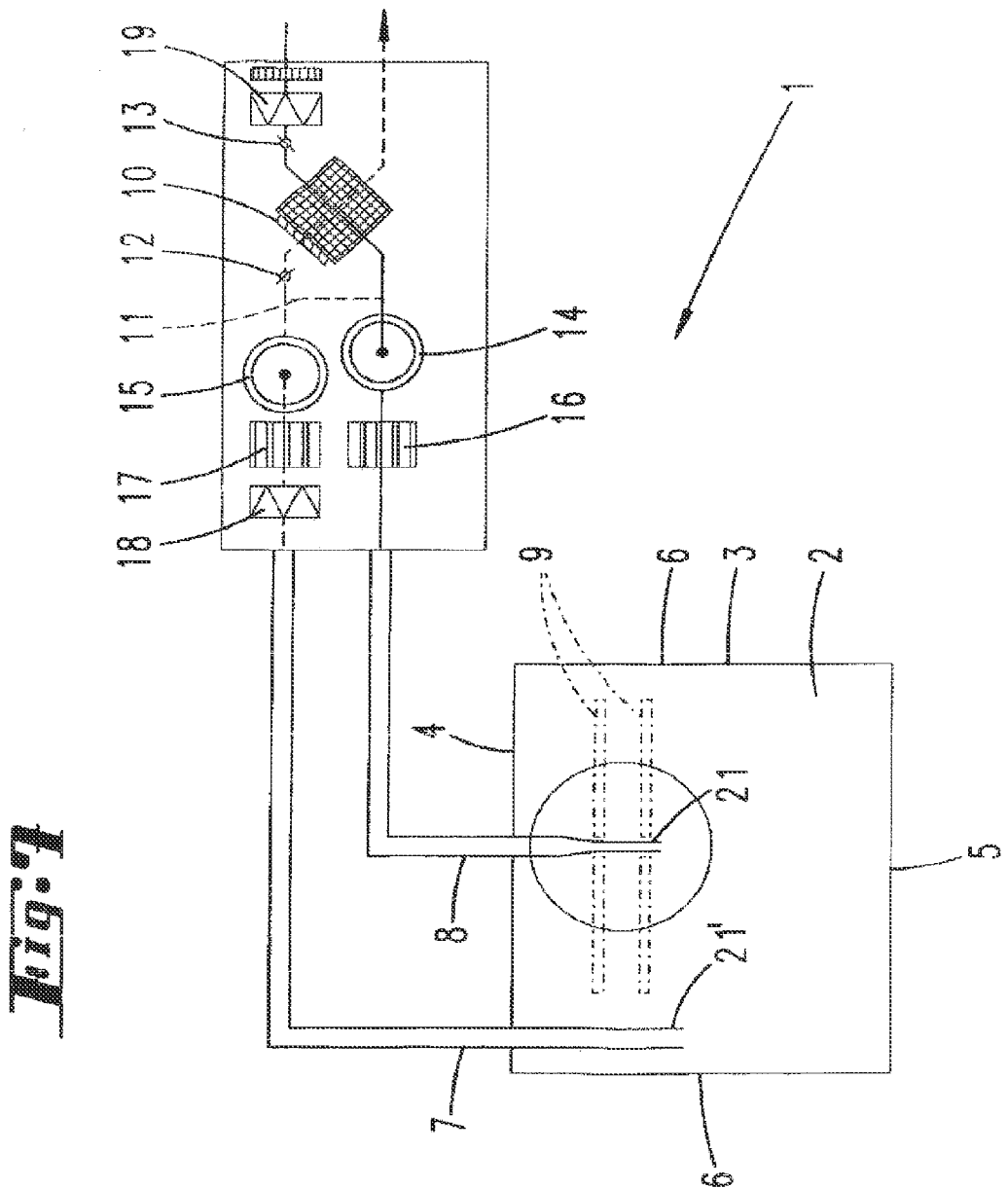

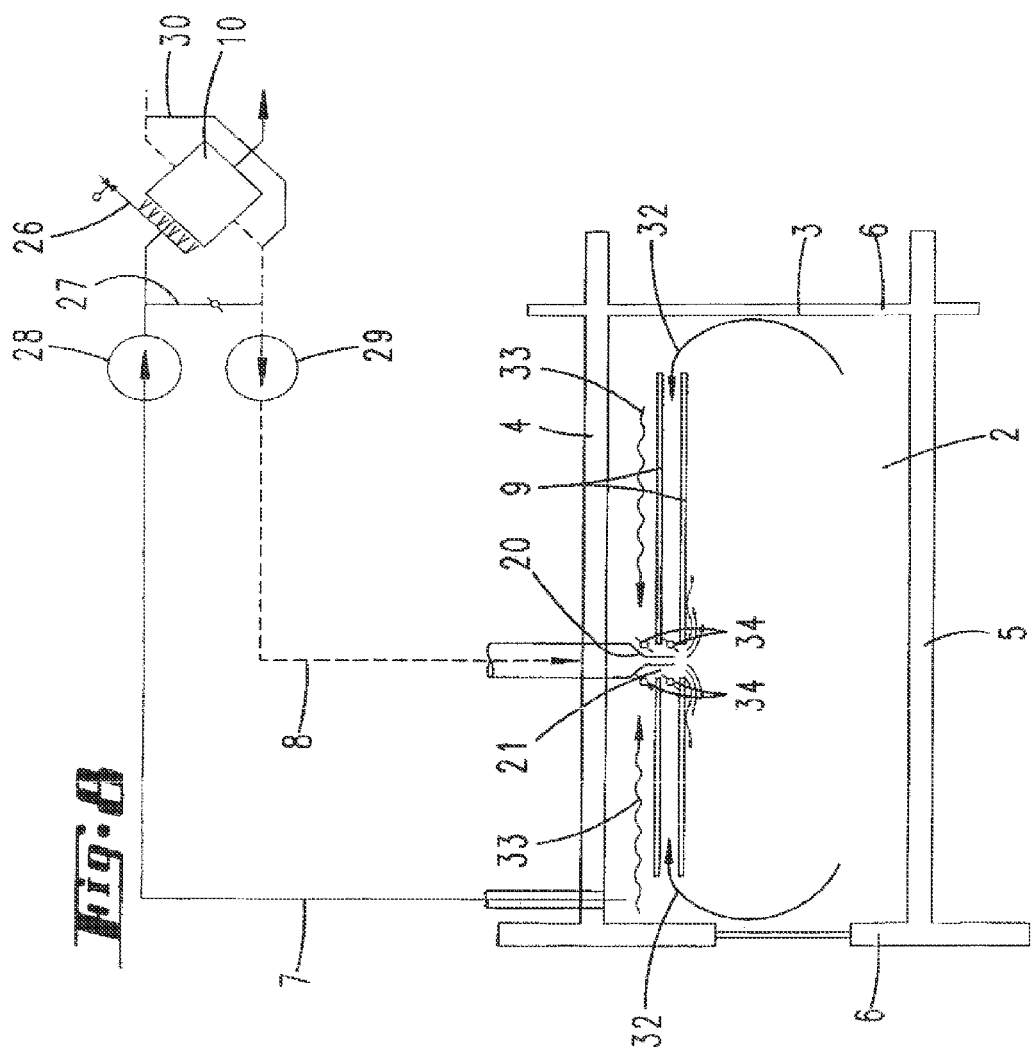

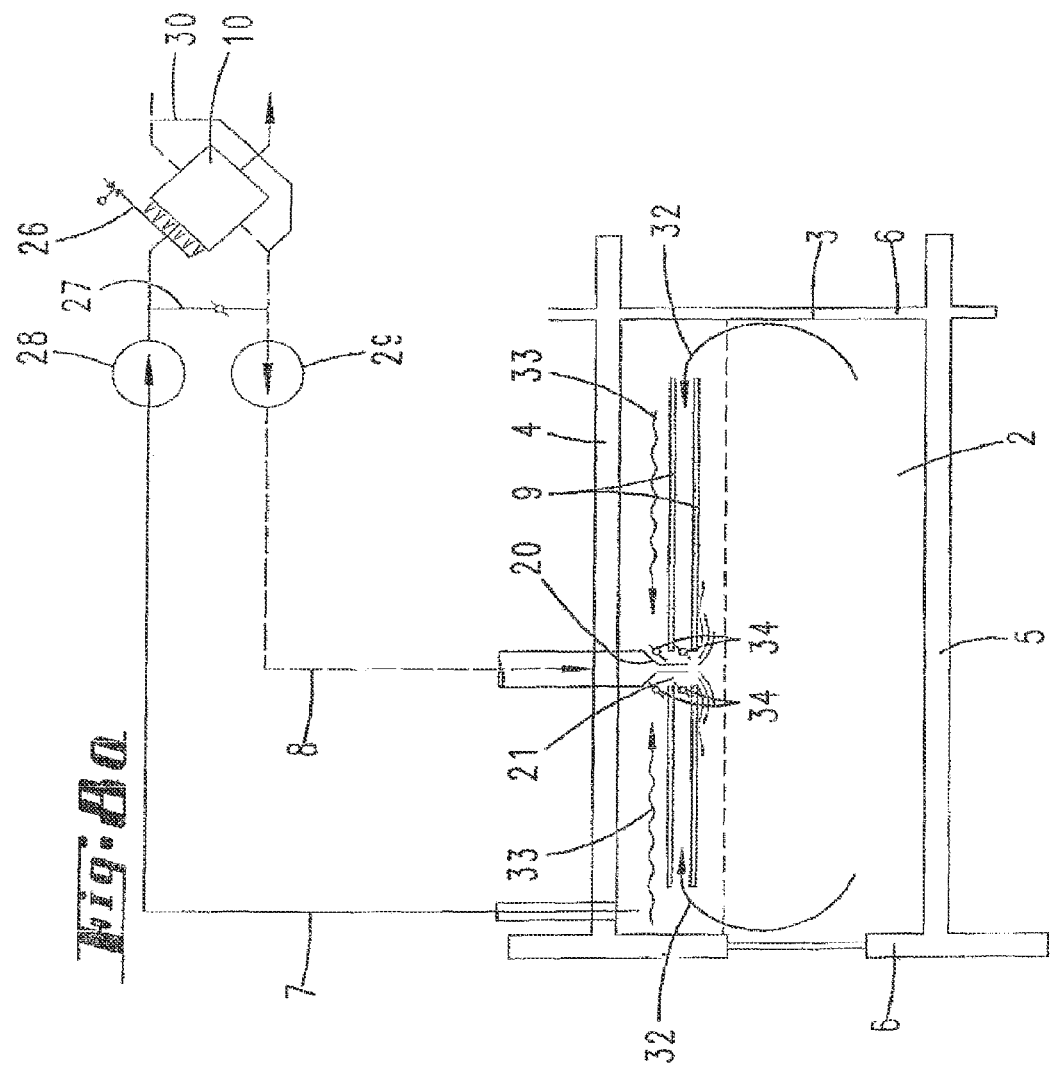

SYSTEM FOR HEATING AND COOLING AMBIENT AIR IN A ROOM OF A BUILDING

CROSS-REFERENCE TO RELATED APPLICATIONS

The present application is a Divisional Application of U.S. patent application Ser. No. 10/517,124, filed Feb. 2, 2006, which is a 371 of International application PCT/EP2003/005796, filed Jun. 3, 2003, which claims priority of DE 102 24 656.4, filed Jun. 3, 2002, DE 102 39 785.6, filed Aug. 29, 2002, and DE 103 21 646.4, filed May 13, 2003, the priority of these applications is hereby claimed and these applications are incorporated herein by reference.

FIELD AND BACKGROUND OF THE INVENTION

The invention relates in first instance to a method for conditioning ambient air in a room of a building in terms of heat and/or cold and optionally humidity, incoming air flowing into the room of the building and outgoing air being conducted out of the room of the building and-preferably-sensible or recuperative heat exchange being carried out between the incoming air and the outgoing air prior to inflow of the incoming air into the room of the building and after exit of the outgoing air from the room of the building.

Methods of this type for conditioning rooms of buildings in terms of heat (the term used hereafter in short to refer to conditioning in terms of heat and/or cold) are known in the widest variety of forms. It is also known to assist the conditioning of a room of a building in terms of heat by latent heat accumulator bodies (cf. EP 0 791 163 B1). Furthermore, it has already long been endeavored to reduce as much as possible the required heat that is supplied to a room by separate heating means—doing so by recovering sensible and/or latent heat contained in the outgoing air and transferring this heat to the incoming air. Furthermore, it is also already known per se to use separate heat sources in a room, such as for instance the cooling of data-processing equipment or the heat dissipation of persons in the room, with a view to effecting a lowering of the heat to be supplied externally.

Conditioning the ambient air in a room generally strives to achieve a healthy climate of the ambient air with regard to a fresh air supply and with regard to conditioning in terms of heat. Moreover, conditioning in terms of humidity is also often aimed for.

SUMMARY OF THE INVENTION

Against this background, the invention is concerned in first instance with the object of providing a suitable method for conditioning the ambient air in the room of a building in terms of heat and/or cold. Furthermore, it is also an object of the invention to provide a latent heat accumulator that is suitable in particular for this and a particularly suitable arrangement of latent heat accumulator bodies in a room of a building.

With regard to the conditioning of a room of a building, it is in first instance and substantially provided by the subject matter of claim 1 that an incoming-air conduction feature, which forms a separate incoming-air flow, is provided and that the ambient air in the room is modified in its thermal content by arrangement of latent heat accumulator bodies in the incoming-air flow or in a secondary flow induced by the incoming-air flow and/or the latent heat accumulator bodies. It is specifically provided that the latent heat accumulator bodies are integrated into the conditioning of the air in the room in a system which in any event has a defined incoming-air flow, in each case with respect to a room of a building, possibly of a larger complex. They make up a major part of the desired conditioning of the air in the room. The air flow imparted to the ambient air in the room (in any event by the defined air flow) contributes significantly to effective utilization of the latent heat accumulator bodies, since higher heat transfer coefficients at the latent heat accumulator bodies can always be achieved in this way than would occur on the basis of natural convection in the room.

Alternatively or possibly also in addition (in which case latent heat accumulator bodies are located in the room of the building but not in such numbers or not of such a volume that they would be adequate on their own for air-conditioning the room), it is also provided that the incoming air is conditioned by means of latent heat accumulator bodies located outside the room of the building prior to inflow into the room of the building. Such a method opens up the possibility of performing concentrated conditioning of air which is later used as incoming air for a room in the building in a separate area of the building. In this respect it is also preferred that a plurality of latent heat accumulator bodies for conditioning the incoming air of a plurality of rooms of a building, for example for the rooms of one story of a multistory (office) building, are located in a separate conditioning room. This alternative method also has the advantage that the (later) incoming air of the room of the building can be conducted past the latent heat accumulator bodies located outside the room of the building at very high air speeds, which would not be possible for example in a room of a building for reasons of comfort. Consequently, relatively high heat transfer coefficients can be achieved there. The maintenance and possible exchange of individual latent heat accumulator bodies can also be carried out outside a room of a building that is in use (as an office) without any major problems. The conditioning room may be, in particular, an otherwise customary room of the building, of a specific story of the building, which is for example filled with latent heat accumulator bodies apart from leaving required access routes free. It may in particular also be an inside room which has no windows to the outside and, for these reasons, is often in any case of little useful value.

It is also pertinent to the invention that the conditioning in terms of heat and optionally also in terms of humidity can be ensured exclusively by the measures described here—in principle by the method as it is presented in claim 1 or claim 2. In addition, an adapted facade configuration may be particularly pertinent here. The transmission (heat/cold) of the facade, in summer and winter, is preferably set to be very low. In addition, special precautionary measures are taken preferably with regard to solar or diffuse radiation. This also applies to the alternative concept, though not necessarily to the use of a room without outside windows, which however is also only one of the possibilities. For instance, it is intended for a passive solar energy gain in winter to be very high. In summer, however, it is intended to be as low as possible. While the transmission through the wall structure, in particular the thermal insulation, can be influenced, the solar energy gain can be influenced for example by covering or shading in the summer and allowing radiation to pass through as freely as possible in the winter. The said latent heat accumulator bodies are preferably formed as plate-like cassettes. In any event, they have relatively large side surfaces, suitable for heat transmission, in comparison with their thickness. The extent of the side surfaces, in any event in a preferred direction of extent, is preferably 10 to 100 times the thickness of the (respective)

latent heat accumulator body. The extent may also be achieved here by combining a number of plate-like latent heat accumulator bodies.

The latent heat accumulator bodies on the one hand furnish the required heat or cold. On the other hand, however, they also furnish the accumulating capability to bridge interruptions in the normal use of a room of a building, for example at the weekend.

It is ultimately the aim of the invention, in configurations that are most preferred, to provide an autonomous system which, as far as possible, is not dependent for energy on outside energy and, moreover in particular, is inexpensive to run, for conditioning the ambient air in a room.

The phase change temperature, predetermined in the latent heat accumulator bodies by the latent heat accumulator material, is also of particular significance. In order, as preferably provided in the scope of the invention, to allow the same latent heat accumulator bodies that are installed in a room of a building or outside a room of a building or in a conditioning room to be used both for cooling and heating conditioning of the ambient air in the room, it is pertinent that the phase change temperature varies within a range of temperatures that are comfortable. For people, this is generally between 20 and 26.degree. C. While in the summer a higher temperature, that is up to 26.degree. C., is felt to be comfortable because of lighter clothing, the lower limit in winter is around 20.degree. C. It is correspondingly preferred for the latent heat accumulator bodies to have a phase change temperature for example at 21, 21.5 or 22.degree. C. It may, however, also be at 23, 24, 25 or even 26.degree. C. (or intermediate values). It is also possible here that latent heat accumulator bodies with different phase change temperatures, which however are in each case within the specified range as far as possible, are located in the room. Specifically in the case of the alternative method, in which the latent heat accumulator bodies are in any event not located in the room of the building that is used by people for their customary work, latent heat accumulator bodies with a phase change temperature of the latent heat accumulator material that is significantly above or below the stated range of comfortable temperatures may also be provided, since a mixed temperature can be achieved by the air conduction duct.

In a most preferred embodiment of the invention, it is also pertinent that the interior climate is isolated virtually completely from the exterior climate, that is the climate outside the building. In this connection, the temperature control must be such that the system is constantly operating in cooling mode. This is specifically explained in more detail further below.

Also pertinent for the system described here, with regard to how the latent heat accumulator bodies are located (at least partly) in the room of the building itself, is the radiant heat exchange that is obtained with elements of this type. The walls and the floor are also directly heated in the radiant heat exchange with the latent heat accumulator bodies located preferably in the vicinity of the ceiling and therefore in this way also provide a climate in the room that is felt to be pleasant. This is so especially because the radiant temperature of the latent heat accumulator bodies is, as stated, in any case in the range of comfortable temperatures. The radiant heat exchange may also be provided by a preferably metallic false ceiling, which for its part is heated to a temperature approaching the phase change temperature of the latent heat accumulator bodies by the latent heat accumulator bodies located above it by means of convection and/or radiation.

It is also of significance in this connection that the radiating area (for example latent heat accumulator bodies or false ceiling) makes up a proportion of the remaining area of the room of over 10%, preferably over 15%. This ratio may also be based solely on the floor area of a room of a building. The proportion is then preferably over 60, more preferably over 70%.

In a further configuration, it is in first instance advantageous and suitable to modify the incoming air or outgoing air within the room in its thermal content by means of the latent heat accumulator bodies—doing so by the incoming air or outgoing air being conducted in terms of flow directly over the latent heat accumulator bodies and/or by the secondary flows that are induced by the incoming air or outgoing air being mixed with the incoming air or outgoing air and a corresponding mixed temperature in the incoming-air or outgoing-air stream being obtained in this way before the stream distributes itself in the room or is conducted out of the room. It is also advantageous here that the latent heat accumulator bodies are located in the vicinity of the ceiling of the room. They may particularly advantageously be located above a false ceiling formed as an air-permeable visible ceiling. Known ceiling systems, for instance based on perforated metal or ribbed expanded metal mesh, may be used preferably as the visible ceiling. It is pertinent that a thermal energy exchange is possible between the ambient air in the room and the latent heat accumulator bodies that are preferably located above the visible ceiling.

If no latent heat accumulator bodies are located in a room of a building itself, the said visible ceiling is nevertheless advantageously provided.

If, in a first consideration, a charged latent heat accumulator body is assumed, i.e. that in the example of a paraffin-based latent heat accumulator body the phase change temperature has been exceeded in the entire latent heat accumulator body, a discharge of the latent heat accumulator bodies takes place if the ambient air in a room has a low temperature. In the vicinity of the latent heat accumulator bodies, the air is heated up and distributed by a free flow in the room that is always present but is correspondingly intensified by the way in which the latent heat accumulator bodies are relatively located and by the incoming-air flow (possibly also outgoing-air flow). Consequently, the temperature in the room of a building increases to the desired temperature, generally in fact to a temperature in the vicinity of the phase change temperature of the latent heat accumulator bodies. This may also be assisted or finely regulated by regulating the quantity of incoming air (volumetric flow) and/or by the temperature of the incoming air. In phases in which the latent heat accumulator bodies have a lower temperature than the ambient air in the room, cold air is generated at the latent heat accumulator bodies, and this cold air descends and correspondingly brings about or intensifies an air circulation in the room of the building (or contributes to this).

In one of the embodiments described, the latent heat accumulator bodies are not only advantageous with regard to the conditioning of the ambient air in the room. They also have advantageous effects on the acoustics or the sound level in a room and, as specifically explained further below, can also contribute to conditioning the humidity. One of the effects of this is that the overall ceiling system constructed in this way can be adapted to the acoustic requirements for the room by layers of foam being provided on one side of the latent heat accumulator bodies or separately from them, for instance mounted on the visible ceiling. In particular, such layers are of open-pore foam.

In principle, latent heat accumulator bodies of this type can then also be recharged by other energy sources, for instance electrical heating. However, it is preferred within the scope of the invention that the charging of the latent heat accumulator bodies takes place by the ambient air in the room and/or the room of a building, that is the walls of the room of a building itself—by means of radiation for instance. This may take place for instance at times when the room of a building is not being used, by the temperature of the ambient air in the room being raised significantly above the phase change temperature of the latent heat accumulator bodies and charging of the latent heat accumulator bodies being performed in this way over a prolonged period of time, for example during the night. For instance in rooms of a building in which heat sources are present in any case, for instance ventilation systems of EDP systems, such raising of the temperature of the ambient air in the room that the aforementioned desired effect is achieved can take place, by simple circulating air operation, in a time period in which the room of the building is not being used and the heat loss to the outside is slowed down greatly, for instance by means of blinds.

With regard to the desired optimal design, in which cooling of the ambient air in the room takes place continuously, it is also aimed for that no other energy sources are required. If they are nonetheless required, they are used at most during the day—for cooling.

The circulation (secondary flow) brought about in this way is also particularly pertinent to the heat exchange of the ambient air in the room with the latent heat accumulator bodies. If, for instance, the incoming air flows in at a rate of twice the air exchange per unit of time (per hour), it is possible by means of the secondary flows to achieve a flow effect at the latent heat accumulator bodies which is—and this is preferably aimed at—up to five times an air change. It is further preferred for the exchange of air to be in the range of 1.5 to 5 times, in particular 2.5, 3, 3.5, 4 times, and the flow effect at the latent heat accumulator bodies to correspond.

Cold air generated by the latent heat accumulator bodies (in comparison with warm air) can also be advantageously used in particular during summer operation. The latent heat accumulator bodies then serve as cooling elements—preferably with unchanged setting with regard to the phase change temperature as compared with winter operation.

It is also preferred that charging and discharging of the latent heat accumulator bodies by the incoming air or outgoing air is by using opposed loading cases. Opposed loading cases may be caused for instance by the differences between day and night. For example, in summer time cooling of a room is desired during the day, whereas at nighttime by contrast, with the exception of a few nights with very high temperatures, cooling often occurs to such an extent that it is possible to use this cooling for—in this case—discharging the latent heat accumulator bodies. For example, in nighttime operation the incoming air is then introduced into the room without heat exchange with the outgoing air, in order to discharge the latent heat accumulator bodies rapidly by lowering the room temperature, but also and in particular by flowing along them, or by the induced secondary flows with respect to them. Opposed loading cases of this type may also be caused by persons who are in the room during office hours, who represent heat sources in a known way, and indeed absent heat sources outside office hours; in addition, also by means of cooling units that (also) run at night, the dedicated heat exchangers of which are again also heat sources.

In particular in the case of the alternative method, a conditioning room with latent heat accumulator bodies in the heat comfort range (or else significantly above it, since a mixture with cooler air can also be effected) may also be advantageously provided as well as a conditioning room with latent heat accumulator bodies from which cooling air can then be mixed in or used on its own.

In particular, it is preferred that the incoming air or outgoing air is conducted in such a way that an incoming-air stream or outgoing-air stream induces a secondary flow that flows along on the latent heat accumulator plates and merges into the incoming-air stream or outgoing-air stream. In this connection, it is also preferred that these secondary flows are or can be influenced in their intensity by dedicated air directing elements. These air directing elements, which are then located in a suitable way as a delimitation in relation to an incoming-air stream or outgoing-air stream, can influence the degree to which the quantity of secondary air flows into the incoming air or outgoing air and in this way contribute to a desired fine regulation of the temperature of the incoming air or outgoing air, but also of the secondary flow as such.

With respect to the latent heat accumulator bodies, it is also preferred that they can be influenced in their output (emission of heat/cold per unit of time)—doing so for example by coverings of the latent heat accumulator bodies which are variable in their degree of coverage and expose a variable area of the latent heat accumulator bodies to the heat exchange with the air flow (possibly secondary flow). This may also be achieved for instance by air directing systems as such.

It is also preferred for a circulating air mode to be operated in the heating period outside office hours, for heating up the latent heat accumulator bodies by means of machine-associated heat sources in the room. This is based on the realization that there is virtually no oxygen demand in this time, that is to say it is possible, at least for a certain time, to dispense with the supply of fresh air; also that, now and then at certain times, the removal of harmful substances and $CO_2$, which is also performed in principle by the air-conditioning of a room, is not required.

It is also preferred that, at the same time as the conditioning of the ambient air in the room in terms of heat, conditioning in terms of humidity is performed. For this purpose, it is preferred for moisture-accumulating elements to be located in the path of the flowing, possibly rising or falling, ambient air in the room. Preferably also in the path of the said secondary flows; more preferably by directly linking the moisture-accumulating elements with the said latent heat accumulator bodies. For the moisture exchange, elements of this type may for instance comprise or consist of silica gel and/or pumice stone and/or foam. Furthermore, they may also be provided by moisture-absorbing plaster finishes. These may for example be applied as a plaster coat to the outside of a latent heat accumulator body.

In addition to the measures described above, the characteristics of the room of a building in terms of the physics of its construction, in particular with regard to transmission and infiltration, loss/gain of heat to/from the outside and solar irradiation, are also of significance. Corresponding measures may also be additionally provided here or the required measures may be selected to match these requirements. The (decentralized) air treatment installation is also of significance.

On the basis of the optimization of the characteristics of a room in terms of the physics of its construction, the air-conditioning installation associated with the room, significant use of latent heat accumulator bodies and possibly moisture accumulators and an adiabatic cooling process, autonomous air-conditioning of the room can be realized. Additional mechanical cooling and/or heating (use of electrical energy) is no longer necessary. The fans, which are all that is left that is still required, can be driven by electricity from wind turbines or photovoltaic solar cells associated with a building.

In particular, it is also of significance that, by the choice of a single phase change temperature of the latent heat accumulator material, for example 21.degree. C., it is possible to cool and heat a room of a building with one and the same phase change material. It is not even necessary for the latent heat accumulator bodies to be changed over for summer and winter operation because a different phase change temperature is required.

The invention also relates to a latent heat accumulator body such as that which can be used in particular in a method as described above. A pertinent feature here is a plurality of latent heat accumulator sub-bodies located inside a closed outer holding wall of a latent heat accumulator cassette. Granule-based sub-bodies are envisaged here in particular. These may be formed in such a way that they have sucked in latent heat storage material by capillary action and this material is correspondingly captured in them. For further explanation, reference is made for instance to WO 00/11424. The disclosure content of the aforementioned document is hereby incorporated in full in the disclosure of the present patent application, including for the purposes of incorporating features of this prior publication in claims of the present application.

It is also preferred that the closed outer holding wall is completely filled with such latent heat accumulator sub-bodies. If the said granule structure or some other structure of the sub-bodies that is suitable with regard to the statements which follow is provided, it is also the case that the latent heat sub-bodies leave air spaces between them. Otherwise, a precautionary measure must be taken, for instance by means of an inserted porous grid, that such air spaces are formed, in any event preferably. This is so because it has been found that a natural circulation which compensates for different heat transfer coefficients, and consequently different discharging, at individual surfaces of the latent heat accumulator body forms within the latent heat accumulator body formed in this way. Even under such conditions as those referred to, a very uniform discharge of the latent heat accumulator body is then obtained.

It is also preferred for the outer holding walls of the latent heat accumulator bodies to have an opening which can be closed by a seal. This is pertinent to filling and possibly removing the latent heat accumulator sub-bodies. The fact that it can be closed with an airtight seal means that the air volume inside the latent heat accumulator body is completely separate from the surrounding volume of air. This is so with regard for instance to the said advantageous flows forming inside the latent heat accumulator body.

As an alternative to the first-mentioned concept, that of a plurality of latent heat accumulator sub-bodies being located inside a closed outer holding wall, it is also possible for a homogeneous latent accumulator matrix body to be located inside the closed outer holding wall. This may be gel-based for example. A latent heat accumulator material, such as paraffin for example, although salt is also possible, which contains a thickening agent is involved here.

The thickening agent may be a copolymer, such as for instance a triblock copolymer, radial block copolymer and/or multiblock copolymer, optionally in conjunction with a diblock copolymer. It may also be only, or substantially, a diblock copolymer. It may also additionally contain oil binders. The said thickening agent may be provided here in such a large proportion, for instance 30 to 50% with respect to the paraffin used, that the desired consistency is obtained. Specifically, reference is also made in this respect to WO 02/08353 A2. The disclosure content of this aforementioned document is hereby also incorporated in full in the disclosure of the present patent application, including for the purpose of incorporating features of the said document in claims of the present application.

Such a latent heat accumulator material, preferably inside the said cassette, may also be located in a distributed manner in a foam matrix of an open-pore foam. The foam may be, for example, a melamine resin foam. The said latent heat accumulator matrix body may in particular also contain graphite or it can be formed on a graphite basis.

The invention additionally relates to the way in which latent heat accumulator bodies are located in a room of a building. It is of particular significance here for latent heat accumulator bodies formed as flat bodies to be located in the vicinity of the ceiling. Such latent heat accumulator bodies are preferably located above an air-permeable visible ceiling. The latent heat accumulator bodies may also be located on an upper side of the visible ceiling with a spacing provided by means of supports or comparable spacing elements; this is to allow them to be flowed around freely both on the underside and on the upper side. The latent heat accumulator bodies are also preferably located in association with an incoming-air opening or outgoing-air opening. Furthermore, two or more latent heat accumulator bodies or rows of latent heat accumulator bodies may be located one above the other. A flow path between latent heat accumulator bodies located one above the other may be closable by means of a flap, associated with the incoming-air opening.

The invention also relates to a building with a plurality of rooms, a room having an incoming-air line and an outgoing-air line, which are connected, preferably outside the room, via a heat exchanger for carrying out a sensible or recuperative heat exchange.

Buildings fitted out with such equipment have already been realized in many different ways. In accordance with the aspects stated at the beginning, however, it is also endeavored for such a building to achieve a climate in the rooms that is as pleasant as possible, while supplying as little separate energy as possible.

In this connection, the invention proposes that latent heat accumulator bodies are located within the room in association with a ceiling of the room and that the thermal content of the incoming air and/or outgoing air is modified by means of the latent heat accumulator bodies. This means that the incoming air and/or outgoing air enters into a heat exchange (also) with the latent heat accumulator bodies. Even though it is already known, for instance in combination with heating bodies, for latent heat accumulator bodies otherwise to be located in a room, here the air is deliberately brought into heat exchange with the latent heat accumulator bodies when it enters the room (incoming air) and optionally also before it leaves the room (outgoing air). This heat exchange may be achieved on the one hand by the incoming air and/or outgoing air flowing directly along on the latent heat accumulator bodies. It may also be achieved, however, by secondary flows induced by the incoming air and/or outgoing air, with intermediate forms also correspondingly being possible.

As already stated with regard to the actual form they take in this case, the latent heat accumulator bodies may preferably be formed as plate-like cassettes. They may be located in a planar extent parallel to the ceiling of a room and suspended from the ceiling. In particular, they may also be in the form of a number of latent heat accumulator body cassettes, one above the other. They may, however, also be made to be suspended vertically from the ceiling, but nevertheless be associated with the ceiling ("baffle arrangement"). Moreover, as a departure from a strictly planar plate geometry, they may also be of a curved shape, for example curved in the manner of a sail—especially since this allows advantageous air flows to be achieved or assisted.

The invention is further explained in more detail below with reference to the accompanying drawing, which however merely relates to exemplary embodiments.

BRIEF DESCRIPTION OF THE DRAWING

FIG. 1 shows a schematic representation of an individual room of a building with natural ventilation;

FIG. 2 shows a schematic representation of air conduction in a room of a building with conventional air-conditioning outside the room of the building;

FIG. 3 shows air-conditioning of a room of a building according to FIG. 2, but suitable for air-conditioning virtually without any outside energy;

FIG. 4 shows a further schematic representation of air conduction of a building with a number of rooms, but explained only with reference to the air conduction in one room;

FIG. 5 shows a detail of the air conduction with respect to the latent heat accumulator bodies;

FIG. 6 shows the detail of an arrangement of latent heat accumulator bodies;

FIG. 7 shows an embodiment that is modified in comparison with FIG. 4;

FIG. 8 shows a further modified system diagram, approximately corresponding to FIG. 4, with flow-influencing flaps also being provided in particular, with regard to the air paths between the latent heat accumulator bodies located one above the other;

FIG. 8a is a view as in FIG. 8 showing air-permeable ceiling in dashed lines.

DETAILED DESCRIPTION OF THE INVENTION

Figure 9:
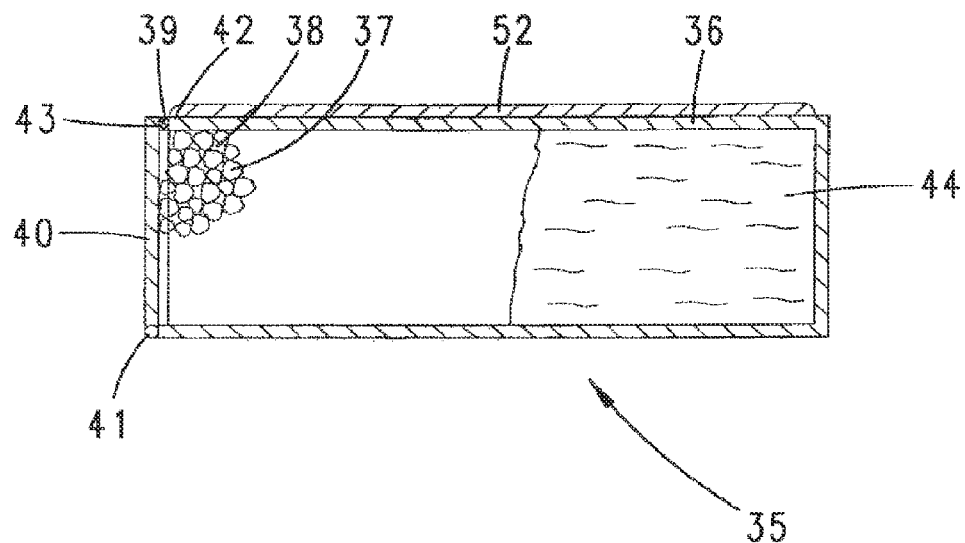
FIG. 9 shows a schematic cross-sectional view of a latent heat accumulator body, two different fillings being indicated.

Represented and described, in first instance with reference to FIG. 1, is a room 2 of a building, which is ventilated and vented in a conventional, natural way. So a ventilating opening 57 is schematically represented, at the same time representing an incoming-air conduction feature and producing in the interior of the room an incoming-air flow 0, by which outside air A flows into the room 2 of the building, preferably without separate control or regulation. Associated with a ceiling 4 of the room 2 of the building are latent heat accumulator bodies 9, preferably parallel to the ceiling. In the case of the exemplary embodiment, the latent heat accumulator bodies 9 are located in two planes one above the other, the incoming-air opening 57, and consequently the incoming-air conduction feature, being formed in the region of the planes of extent of the latent heat accumulator bodies 9, preferably, as evident, above the uppermost latent heat accumulator body 9. Especially in the case of such a system, based on natural air flow, it is of significance that the outside air A flows along on the latent heat accumulator bodies 9 when it flows into the room 2 of the building, or in any event induces such secondary flows that lead to ambient air in the room flowing along on the latent heat accumulator bodies 9 and so permit conditioning of the ambient air (or contribute to this). This is so because the radiant heat exchange of the side walls and of the floor of the room 2 of the building with the latent heat accumulator bodies 9 is also of significance.

The radiant heat exchange is of significance in the case of all the embodiments. In this connection, it is in particular also of significance that the latent heat accumulator bodies 9 cover a specific proportion of the ceiling 4, because this is also a measure of with what proportion of the floor and the side walls they are in radiant heat exchange. This proportion is preferably above one third of the ceiling area, more preferably above half the ceiling area and even more preferably above two thirds of the ceiling area.

In a further detail with respect to the embodiment of FIG. 1, it is provided that ambient air leaves the room 2 of the building via natural openings or, in the case of conventional ventilation, for instance by means of opening of windows 58. This is indicated by the arrow designated AL.

It is also of significance in the case of this type of room air-conditioning of an individual room 2 of a building that there is a separate heating element 59 and/or a separate cooling element 60 inside the room 2 of the building. The heating element may be a customary hot-water heating body—for example a radiator. The cooling element 60 may be a customary fixed or portable cooling unit.

With regard to the design of such a conditioning system, the following can be taken as a basis with respect to heating demand: if the overall heat demand is assumed to be three hundred units of heat, a proportion of fifty to one hundred and fifty units of heat can be contributed by the latent heat accumulator bodies 9, and the remaining proportion of one hundred and fifty to two hundred and fifty units of heat can be contributed by a heating element 59. It is preferred to design the latent heat accumulator bodies 9 in such a way that they contribute one hundred units of heat and a heating element 59 contributes two hundred units of heat.

With respect to cooling, the design is preferably provided in such a way that, in the case of a total demand of one hundred and seventy units of cold, the latent heat accumulator bodies 9 contribute sixty to one hundred and sixty units of cold, a cooling element 60 contributes ten to one hundred and ten units of cold. It is preferred here that the latent heat accumulator bodies 9 contribute one hundred and ten units of cold, whereas a cooling element 60 contributes sixty units of cold.

Therefore, whereas with respect to heating the latent heat accumulator bodies contribute a fifth to half the heating output of a heating element 59, with respect to cooling the latent heat accumulator bodies 9 contribute half to six times that of a cooling element 60.

The embodiment of FIG. 2 concerns the room air-conditioning of a room 2 in a relatively large building, with central treatment of the air. Here, the treatment of the air is conventional.

As in the case of the previous exemplary embodiment, latent heat accumulator bodies 9 are located near the ceiling 4 and parallel to it, in—for example—two planes one above the other. However, a central air-supply line 8 and air-exit line 7 are provided as incoming-air conduction feature. It is of significance that the air-exit line 9 is disposed concentrically in relation to the air-supply line 8. This already provides a first (counter-current) heat exchange of the incoming air with respect to the outgoing air. The counter-current heat exchange is preferably located inside the room of the building.

Also formed in the air-supply line 8, at a distance from a mouth 21, is a nozzle 20. The nozzle 20 comprises a funnel-shaped taper. The tapering portion 61 is, however, further surrounded, also with a radial spacing, by a line continuation 62. The line continuation 62 has inlet openings 63, in order to suck ambient air in the room in through them. To be precise, in particular ambient air which passes along at and in contact with the latent heat accumulator bodies 9 passes into the line continuation; more preferably, such ambient air as has previously passed along between and in contact with two latent heat accumulator bodies 9 located one above the other. This is achieved by the inlet openings 63 being located above one, preferably all, of the latent heat accumulator bodies 9 located one above the other. They may also extend downward so far that they rest on the latent heat accumulator bodies.

The mouth 21 has a baffle plate, which directs the emerging air in the direction of the extent of the latent heat accumulator bodies 9. This also allows the desired secondary air flow to be induced in a suitable way.

Also integrated in the air-supply line 8 are a cooling unit 64 and a heating unit 65. This allows additional cooling and additional heating of the incoming air to be performed. It is also known per se to provide blowers 14, 15 in the air-supply line and the air-exit line. In addition, the incoming air and the outgoing air are conducted in a heat exchanger 10.

If it is assumed that the heat exchanger 10 has an efficiency of 50%, the following cooling and heating situations arise:

In the case of cooling, the latent heat accumulator bodies 9 may be designed in such a way that they furnish an output of one hundred and ten. Then an additional cooling output of fifty units is still required, so as to arrive at a total cooling output, as required, of one hundred and sixty units.

When heating, the latent heat accumulator bodies 9 can furnish a heating output of one hundred units. An additional heating output of a further hundred units can be furnished by means of the heating element 65, to arrive at a total heating output of two hundred units.

If the heat exchanger is chosen with an efficiency of 90%, the required additional output is then reduced in the case of cooling to thirty units, and in the case of heating no additional output at all is any longer required.

The embodiment of FIG. 3 corresponds to the embodiment of FIG. 2, although further efforts have been made here to achieve autonomous room air-conditioning.

As a difference from the embodiment of FIG. 2, adiabatic cooling 66 is provided. For this purpose, rainwater 67 is previously collected in a cistern 68 and, when needed, sprayed into the outgoing air before it passes through the heat exchanger 10. The evaporation of the water produces a desired cooling effect, which allows suitable cooling of the outside air.

In order also to achieve required electrical energy, in particular for the fans 14, 15, solar cells 69 and/or wind wheels 70 are provided. In this way, room air-conditioning which makes it possible to dispense with additional heating or cooling, both in summer operation and in winter operation, can be achieved. To this extent, the elements 64, 65 need not even be installed.

With reference to the embodiment of FIG. 4, a ventilation system 1 is also described with respect to a building having a plurality of rooms that is not represented in any further detail. A room 2 of the building is reproduced in abstract manner by a room boundary 3.

The room 2 of the building has a ceiling 4, a floor 5 and side walls 6. In one or more of the side walls 6 there may also be window areas.

An air-exit line 7 and an air-supply line 8 open out into the room 2 of the building, in the exemplary embodiment through the ceiling 4.

Also located in the room 2 of the building, but associated with the ceiling 4, are latent heat accumulator bodies 9. These are plate-shaped latent heat accumulator bodies. For specific possible configuration of such latent heat accumulator bodies, reference is also made to a prior art according to EP 1 108 193 B1 and EP 983 874 B1.

Outside the room 2, the incoming air and outgoing air are conducted through a heat exchanger 10, which may also be formed for example for falling below a dew point.

On the room side of the heat exchanger 10, a bypass line 11 is provided. A shut-off valve 12 is located in the outgoing-air line 7 between the branch to the bypass line 11 and the heat exchanger 10. Furthermore, a shut-off valve 13 is likewise located in the air-supply line 8, upstream of the heat exchanger 10 in the direction of flow. So it is possible to operate in a purely circulating air mode if both shut-off valves 12, 13 are shut off.

Moreover, any intermediate positions are of course possible. This means that a greater part of the air is conducted in circulating air operation and a smaller part is respectively fed in, and vice versa.

To form an incoming-air flow and outgoing-air flow, blowers 14, 15 are also included in the air-supply line and air-exit line, respectively. In addition, cooling and/or heating and/or humidifying of the respective air stream can be performed in a customary way by means of cooling or heating units 16, 17 and humidifying devices 18, 19.

As evident in further detail, in particular from the representation according to FIG. 5, the mouth of the air-supply line 8 is specially configured. A nozzle 20 is provided, furnishing an acceleration of the incoming air exiting into the room 2 of the building by providing a reduction in the cross-section in comparison with the cross-section of the line 8.

Four latent heat accumulator bodies 9 are provided in the case of the exemplary embodiment, in a plate-like configuration. The latent heat accumulator bodies 9 are spaced apart horizontally from one another in the region of the mouth of the air-supply line 8. To be precise, they are spaced apart by an amount based on the size of the diameter of the air-supply line 8 upstream of the nozzle 20. As is evident, the spacing apart a of the latent heat accumulator bodies 9 in the case of the exemplary embodiment corresponds to the diameter d of the air-supply line 8. That does not mean, however, that the air-supply line must have a circular cross-section. This may also be the dimension of a narrow or long side of a rectangular cross-section of the air-supply line 8. The spacing a is preferably less than 30 cm, more preferably less than 20 cm.

The nozzle 20 has a mouth 21, which in the case of the exemplary embodiment is formed above two latent heat accumulator bodies 9 horizontally associated with each other. At the same time, however, as is in any event preferred, it is also formed below two further latent heat accumulator bodies 9', which are likewise horizontally associated with each other and disposed vertically above the latent heat accumulator bodies 9. This produces a secondary flow, which is indicated by the arrows 22, 23. This creates a secondary flow at the latent heat accumulator bodies 9, 9', directed in the direction of the nozzle 20 or the incoming-air stream following on from it, indicated by the arrows 24, which passes along at and in contact with the latent heat accumulator bodies 9. Depending on the loading case, it is charged there with heat or gives up heat, so that it enters the incoming-air stream in a cooled state. The fact that these processes take place at the ceiling of the room means that there is a sufficiently long distance for turbulence with respect to the persons who are in the room of the building and are pertinent with regard to the feeling of comfort provided by the ventilation of a room.

In a further detail, FIG. 6 reveals that the plate-like latent heat accumulator bodies 9, 9' can be connected to one another by means of securing elements 25 associated with their corner regions. By means of the same securing elements 25, they can then also be secured to the ceiling 4 of the room, which is not represented in any further detail in FIG. 6.

It is evident that these are rod-shaped securing elements. In the simplest configuration, they may be spindle elements, which have a self-locking thread. Nuts secured to the spindles may serve for instance as a support for a latent heat accumulator plate 9' or 9. This also allows simple adjustment. If the through-openings in the corner regions of the latent heat accumulator plates 9, 9' are of an appropriate size, it is also possible to align these latent heat accumulator bodies such that they are inclined in relation to one another, as a departure from a strictly horizontal arrangement. This may be advantageous with regard to the secondary flows that are desired or created.

Independently of the secondary flows induced by the incoming-air stream in the exemplary embodiment, further secondary flows may also be created by a driving temperature difference in the room, between a room temperature and a latent heat accumulator plate temperature—in any event whenever the latent heat accumulator temperature is lower than the room temperature. Cold air generated in this way tends to descend and warm air correspondingly tends to swirl upward.

The subject matter of FIG. 7 is a system diagram that is fundamentally the same as that described with respect to FIG. 4. The reference numerals have been taken over and represent the same parts and associations, unless otherwise described below.

It is pertinent that, in the case of the embodiment of FIG. 7, the mouth 21 of the air-supply line 8, like the mouth 21' of the air-exit line 7, is located below the level of the height of the latent heat accumulator bodies 9. So there is virtually no influencing of the flow of the air with respect to the latent heat accumulator bodies 9—with the exception for instance of secondary flows that generally circulate in the room.

In the case of this system diagram, the height at which the mouth 21 of the air-exit line 7 is located is only of secondary significance. It could also be located higher, with the mouth 21 nevertheless below the level of the height of the latent heat accumulator bodies 9, in the way in which they are indeed represented.

Also in the case of the subject matter of FIG. 8, the same parts are provided with the same reference numerals as in the case of the subject matter of FIG. 4.

With respect to the system diagram generally, it must be stated in first instance that a humidifying device 26 is provided in the air-exit line 7. The humidifying of the outgoing air permits adiabatic cooling of the outgoing air. In the subsequent heat exchange with the incoming air, heat can then be extracted from the latter—to the extent desired—for cooling purposes. Furthermore, a bypass 27 is provided between the air-exit line 7 and the air-supply line 8, downstream (with respect to the air-exit line 7) of an outgoing-air fan 28 installed in the air-exit line 7 and upstream of an incoming-air fan 29 fitted in the air-supply line 8. Also provided is a bypass line 30, from the outside-air line 31 to the air-supply line 8, bypassing the heat exchanger 10. The heat exchanger 10 is designed here as a purely sensible heat exchanger. However, it may also be a recuperative heat exchanger. It has, for example, an efficiency of approximately 80% (under standard conditions).

It is of further significance that regulating flaps 34 are provided, associated with the nozzle 20 with respect to the flow paths 32, 33 formed between the latent heat accumulator bodies 9 or above a latent heat accumulator body 9 and the ceiling 4 of the building. These allow the air flow mixing into the incoming-air stream to be advantageously regulated.

With reference to FIG. 9, a latent heat accumulator body as such is represented in the way in which it is preferably used. A latent heat accumulator body, provided overall with the reference numeral 35, has an outer holding wall 36. In cross-section, as represented, the outer holding wall 36 has for example a rectangular profile. The outer holding wall is preferably formed from a metal or metal sheet.

According to a first embodiment, a plurality of latent heat accumulator sub-bodies 37 are located inside the closed outer holding wall 36. The arrangement is such that the interior space enclosed by the outer holding wall 36 is filled completely—just with the exception that air spaces 38 leading to flow paths remain between the latent heat accumulator bodies 37. This is so because, if there is different discharging of the latent heat accumulator body on one of the outside surfaces, it produces an air flow in the interior of the latent heat accumulator body which leads to a rapid transport of heat, and consequently thermal equilibrium, between regions of the latent heat accumulator body that are subjected to different loading.

It is also of significance that the outer holding wall 36 has a seal-closed opening 39. In the case of the exemplary embodiment, an opening flap 40, which forms part of the outer holding wall 36, is represented. This flap 40 is articulated at a hinge 41. A peripheral seal 43 is disposed on an end face 42 of the associated outer holding wall. A suitable snap-locking mechanism is provided, but not represented any further in the drawing. The opening which can be closed by a seal is of significance for filling and emptying such a latent heat accumulator body. Moreover, the sealing closure is also of significance with regard to the air flows referred to that are created within the latent heat accumulator body—but also to the extent that a certain pressure, optionally a positive pressure, can be set and maintained inside the latent heat accumulator body, in order to counteract a vapor pressure of the latent heat accumulator material.

As an alternative to filling with latent heat accumulator sub-bodies 37, filling with a homogeneous gel substance 44 is also possible, as represented in the right-hand part of the latent heat accumulator body 35. Furthermore, a moisture-accumulating layer 52 may be located on an outer holding wall 36.

Figure 10:
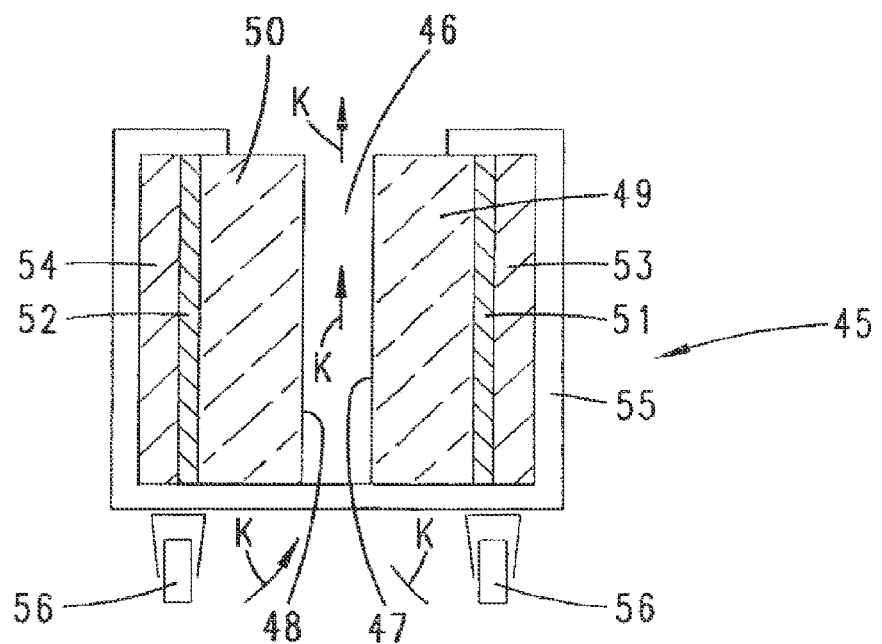
FIG. 10 shows a schematic cross-sectional view of a thermal buffer element.

The subject matter of FIG. 10 shows a thermal buffer element 45 on a latent heat basis for room air-conditioning. Thermal buffer elements of this type are of significance for example in rooms in which large amounts of heat are generated by electrical machines or else EDP systems, sometimes are also generated for very limited times and must not then lead to the room suddenly heating up. It is of significance that a chimney-like air flow path 46 is provided between latent heat accumulator outer chimney surfaces 47, 48, located opposite one another. In the case of the exemplary embodiment, these are the outer surfaces of two latent heat accumulator bodies 49, 50, which may in principle be formed in a way corresponding to the latent heat accumulator body 35 that is represented in FIG. 9 and described with reference to the latter.

The cross-sectional representation shows that here, too, a rectangular cross-section is present. On the sides remote from the surfaces 47, 48, there may respectively be provided in first instance a moisture-accumulating layer 51, 52. In addition, a sound-insulating layer 53, 54 may also be subsequently provided. The sound-insulating layer may be for example a nonwoven material or a foam, preferably open-pore foam. The entire arrangement is held together and formed as a unit by a framework 55, which is only schematically represented here. This comprises individual struts, which leave between them sufficient free space to allow the desired chimney flow to form and be sustained, indicated by the arrows K; furthermore, however, to allow the sound to penetrate from the outside to the sound-absorbing elements.

It is also preferred for the thermal buffer element 45 to be formed as a whole in such a way that it is mobile. In the case of the exemplary embodiment, castors 56 are provided for this purpose.

The thermal buffer element 45 can hereby not only be made to move to suitable locations in the room. It can also be made to move for discharging, for example out into the open or into some other room of the building, for instance a room of the building which is climatically conditioned on the basis of the method described above.

In addition, such a thermal buffer element may of course also be used preferably in a climatically conditioned room as described above, and in an integrating manner.

Furthermore, it can be used not only to buffer an unwanted quantity of heat that occurs, but also to compensate for cold or cold air intrusion, by indeed being used as a heat emitter.

With respect to the latent heat accumulator bodies, an output of 3 to 8 W/m.sup.2 is preferred, advantageously 8 W/m.sup.2. The air flow is designed to produce such an output.

Figure 11:
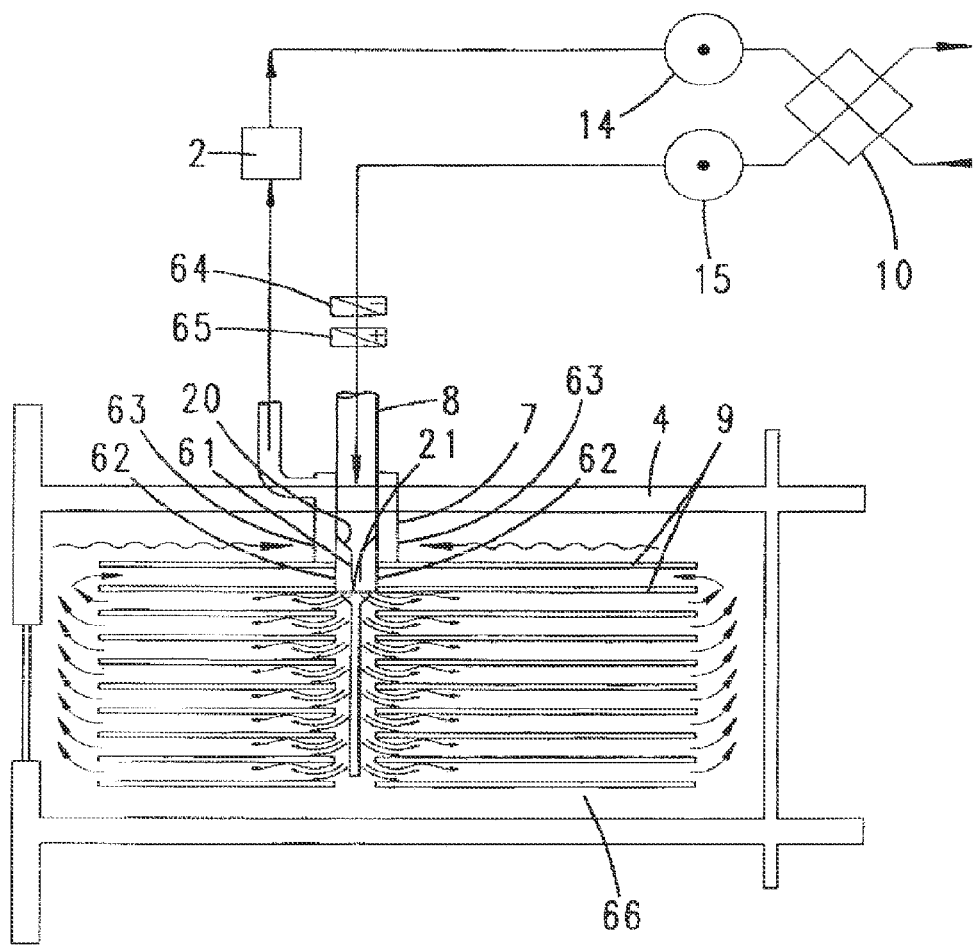
FIG. 11 shows a schematic representation of a conditioning room with the room of a building which is then to be flowed through, in the ventilation path.

With reference to FIG. 11, the alternative method is now represented. A plurality of heat exchangers 9 are located in a conditioning room 66, for example over the entire height of the room. Free spaces, concealed in the drawing, may also be provided in the room to provide passages in which a member of the maintenance/operating personnel has in each case access to the individual latent heat accumulator bodies 9. Moreover, in the same way as described for instance with reference to FIG. 2, incoming-air conduction and outgoing-air conduction may be provided in the conditioning room. The only difference is that the outgoing-air conduction then goes to a room 2 of the building in which the outgoing air from the conditioning room 26 enters as incoming air and only after that is drawn away again, for example via the fan 14 and heat exchanger 10, and discharged to the outside.

It may, however, of course also flow at the same time into a number of rooms 2 of a building and then also be discharged together to the outside. Equally, mixing with outside air is also possible in customary manner.

It may be recommendable, as represented in FIG. 11, to provide the mouth 21 with appropriate outlet gratings over virtually the entire height of the conditioning room 16 in which there are also located latent heat accumulator bodies 9.

Figure 12:
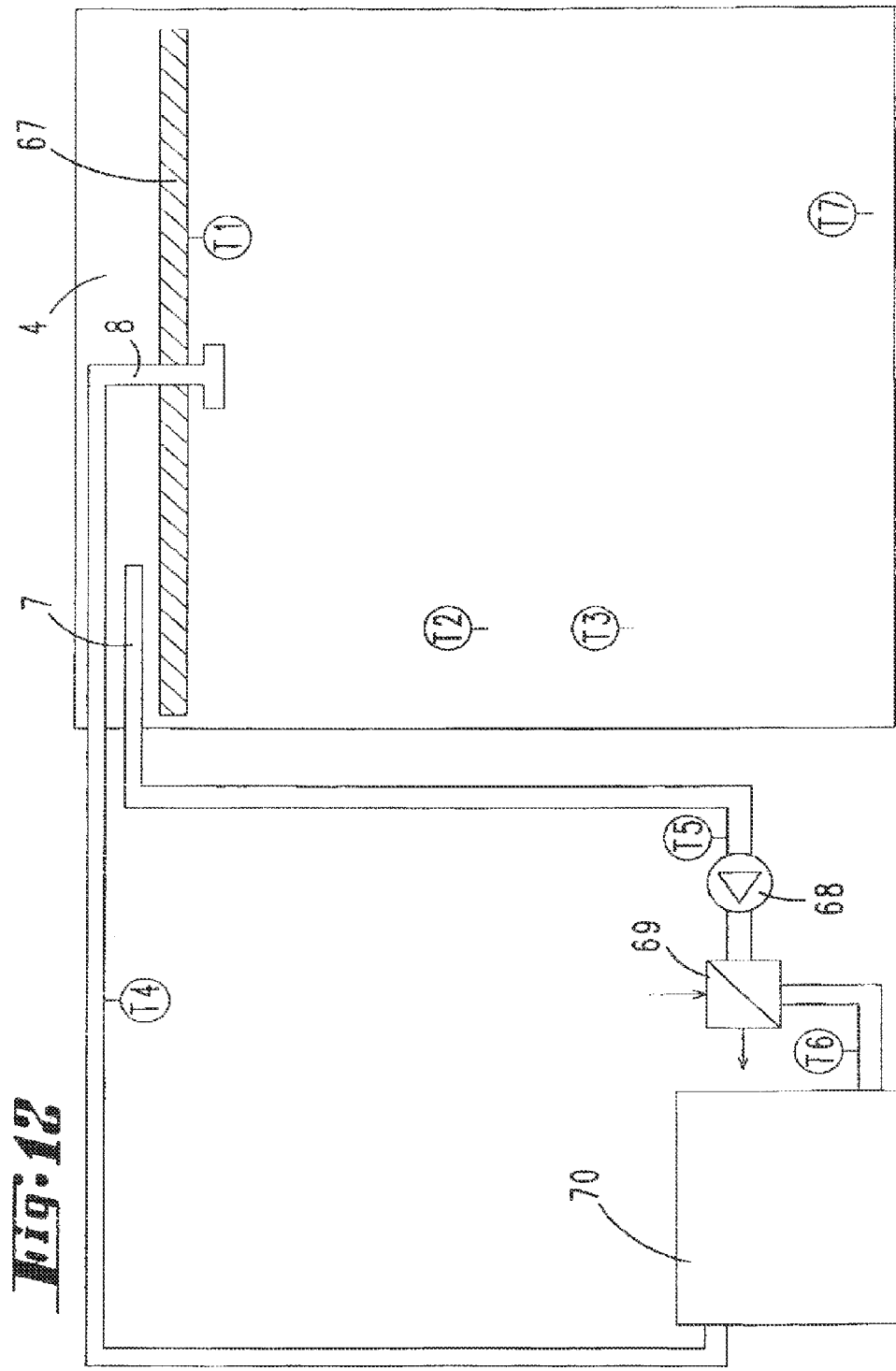
FIG. 12 shows an embodiment corresponding to FIG. 11, in a further modification.

An embodiment that is modified in this respect is also represented in FIG. 12.

Above an acoustic ceiling 67 that is formed on its own—it is also possible in principle, albeit preferably, for latent heat accumulator bodies to be located here—and is located underneath the ceiling 4 of the room of the building, there is provided the air removal feature 7. The air is therefore extracted by suction from the room above the acoustic ceiling 67.

By contrast, the air-supply line 8 passes through the acoustic ceiling 67. Below the acoustic ceiling 67, the fresh air is blown into the room.

For controlling and regulating the air supply, the temperatures at various locations are measured. A temperature T1 directly below the ceiling element, a temperature T2 at a height in the room 1.5 m above the floor, a temperature T3 a height in the room 1 m above the floor, a temperature T4 as the incoming-air temperature and a temperature T5 as the outgoing-air temperature.

Also located in the air-exit line 7 is a fan 68, which for its part is located upstream of a heat exchanger 69, in which fresh air can also be mixed in.

A temperature T6 is also measured downstream of the heat exchanger 69 and upstream of a latent heat accumulator body 70, which is located in a room of its own.

In the room of the building, a temperature T7 is also measured at the floor or just above the floor. With respect to the floor, it is incidentally preferably provided that additional floor heating is installed.

Figure 13:
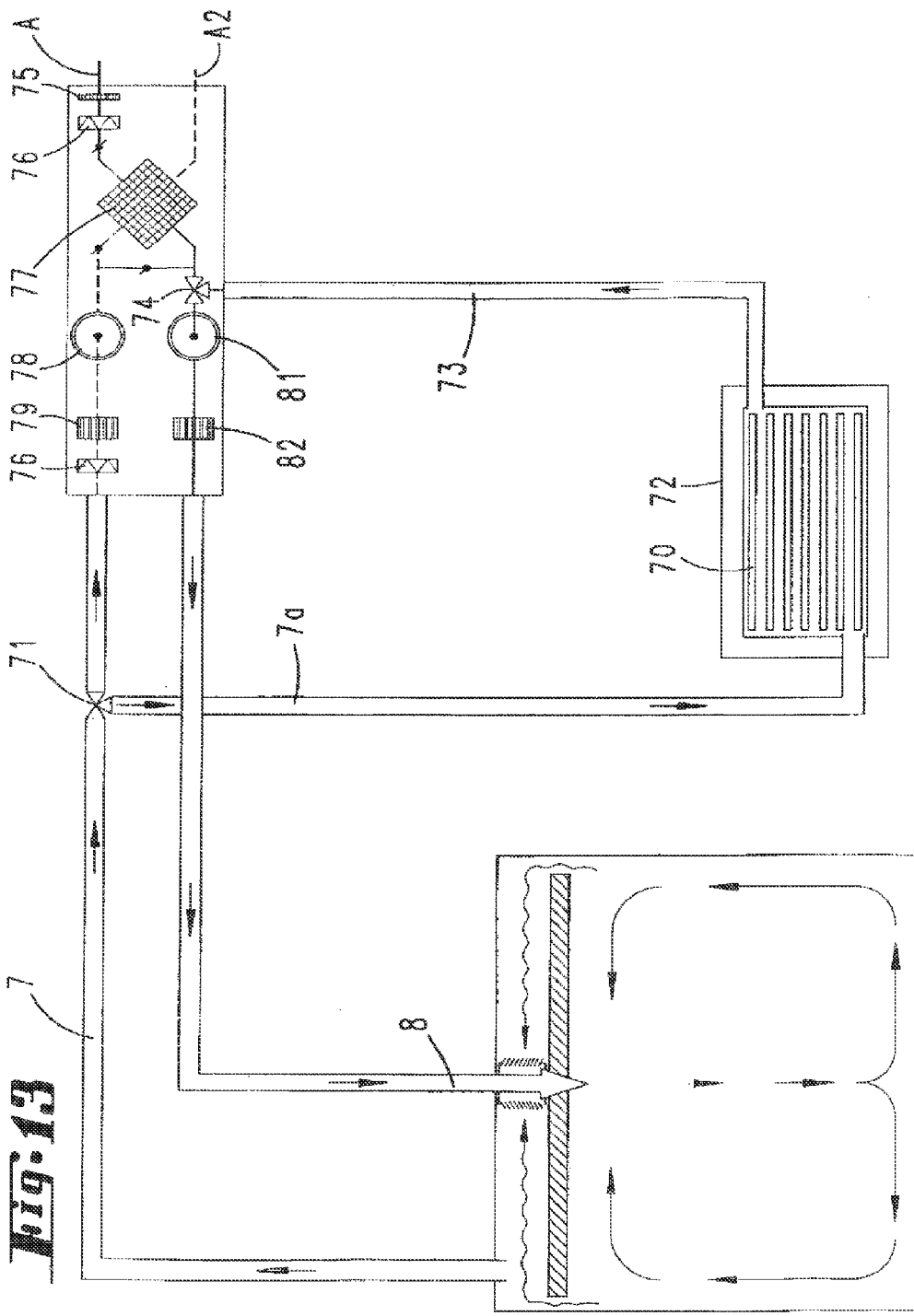
FIG. 13 shows a representation of air conduction.

A further detailed representation of air conduction for such a room is reproduced in FIG. 13.

The same reference numerals designate the same items as explained in particular with respect to FIG. 12.

Located in the air-exit line 7 is a three-way valve 71, which divides the outgoing-air stream into a partial air stream 7a, leading to the latent heat accumulator 70, and a partial air stream 7b, which is ultimately discharged to the outside. The partial air stream 7a—in heating operation—is heated again along the latent heat accumulator body or bodies 70, which are also surrounded (as a whole) by an insulation 72, and then fed via a corresponding line 73 to a further three-way valve 74 for mixing into the air-supply line 8.

With this layout, the outside air A passes in first instance through a filter 75, then a humidifying device 76 and an air/air heat exchanger 77. In the heat exchanger 77, heat is exchanged with respect to the outgoing air A1, which has previously likewise passed—after the three-way valve 74—through a humidifying device 76, then a cooling or heating unit 79 and a fan 78.

With respect to the outside air, a bypass line 80 is also provided downstream of the heat exchanger 77 and upstream of the three-way valve 74, and after the three-way valve 74 the outside air passes with possibly admixed, heated circulating air through a fan 81 and a cooling/heating unit 82.

Instead of the latent heat accumulator body 70 located outside the room of the building in the arrangement according to FIG. 12, it is also possible for only a suspended ceiling with latent heat accumulator bodies to be provided in the room of the building. Then the air conduction goes over directly into the incoming air after the heat exchanger 69.

As explained, additional heating may be provided in the room of the building, for instance as floor heating, in both cases, the arrangement according to FIG. 12 and also optionally the arrangement according to FIG. 13, although in this arrangement the cooling/heating units 82 are in principle provided for this.

The room indicated in FIG. 13, in which the latent heat accumulator body or bodies 70 are located, may, depending on how many rooms are to be supplied in this way, be extended as desired, optionally also by adding additional rooms in which latent heat accumulator bodies 70 are located.

In the case of the suspended ceiling according to FIG. 12, if latent heat accumulator bodies are located in it, the ceiling may for example comprise a sheet steel structure, the sheet thickness being for instance between 0.6 and 1.2, preferably 0.8 to 1 mm, thickness. The latent heat accumulator bodies can then be accommodated in these sheet steel cassettes. These may be, for example, the latent heat accumulator bodies already mentioned, with a foam base, for instance with a melamine resin foam base, which is impregnated with the latent heat accumulator material. The thickness of the latent heat accumulator bodies formed in this way may be 5 to 45 mm, and they may have a weight of 4 to 45 kg per square meter.

The latent heat accumulator bodies formed in this way may also be surrounded with a vapor-diffusion-impermeable sheeting, for instance an aluminum foil.

The weight per unit volume of such a latent heat accumulator body may be in the range of 1000 kg per cubic meter.

Figure 14:
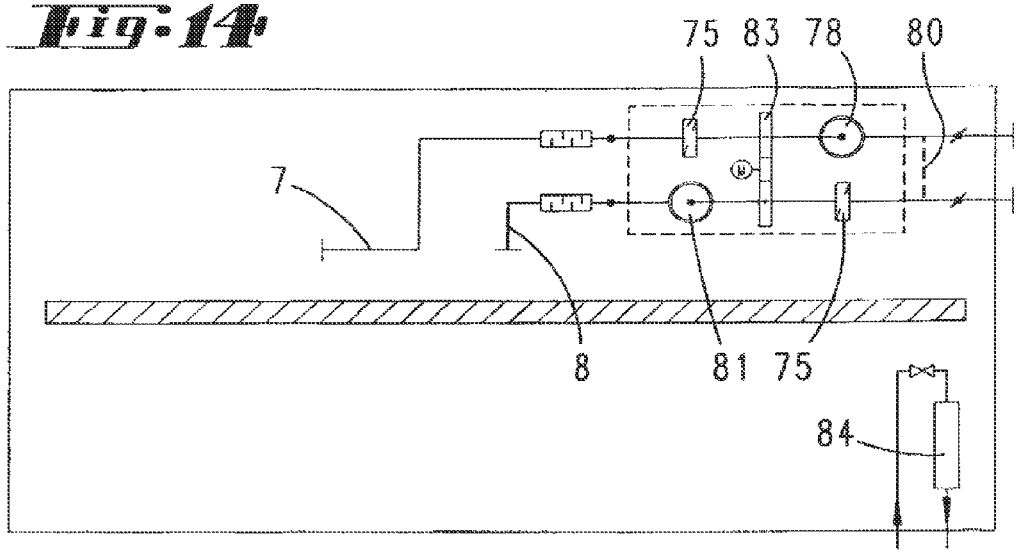
FIG. 14 shows air conduction above a latent heat accumulator ceiling.

An air layout of this type is represented in FIG. 14. With regard to the outgoing air 7 and the incoming air 8, reference can also be made in principle to the further explanations, for instance in FIG. 12.

It is pertinent that a regenerative heat exchanger 83, which transfers heat and also moisture between the incoming air and the outgoing air, is also included between the air-supply line 8 and the air-exit line 7.

Additional heating for the room of the building is indicated at 84. Otherwise, the same units are designated by the reference numerals from FIG. 13.

Also of special significance is that both the outgoing air and the incoming air is fed in above the suspended ceiling.

Additional heating may, further, also be located in the air-supply line before entry into the room of the building in a way corresponding to reference numeral 82 in FIG. 13, which is not represented in FIG. 14. Moreover, before passing through the units, a bypass line 80 may also be provided between the supply-air and the air-exit line, only represented by dashed lines in FIG. 14 because of the optional character. The embodiment according to FIG. 15 corresponds in principle to the embodiment according to FIG. 14.

The only difference is that here, in a way comparable also the embodiment of FIG. 13, induction ventilation is provided underneath the ceiling comprising latent heat accumulator bodies.

Of special significance for the induction ventilation is that the air outlet is provided so as to pass along at and in contact with the underside of the suspended ceiling or the latent heat accumulator bodies provided in it. This makes use of what is known as the Koanda effect.

This design may be used for all the exemplary embodiments shown where the air is blown in underneath and on the room side of the latent heat accumulator bodies.

Figure 15:
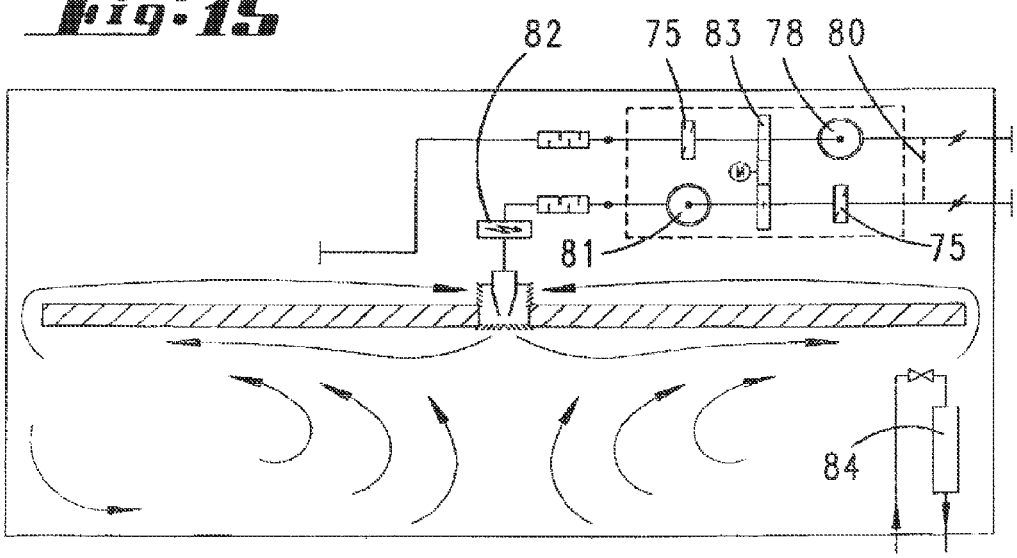
FIG. 15 shows air conduction with blowing out and suction removal along the upper side and underside of latent heat accumulator bodies.

In the case of the embodiment of FIG. 15, it is also of significance furthermore that an induction effect, as already described in principle in the embodiment of FIG. 5, is used at the same time in the air-supply line above the suspended ceiling or the latent heat accumulator bodies.

That is to say that air is sucked in parallel to the surface of the latent heat accumulator bodies, and consequently, with respect to ambient circulating air in the room, a forced flow is initiated—above—along the latent heat accumulator bodies, while at the same time, on the underside, the incoming air flows along more intensely than as a result of naturally circulating air, before it flows further into the room, utilizing the said Koanda effect.

In the case of the embodiment of FIG. 15, otherwise, the outgoing air is extracted by suction above the latent heat accumulator bodies in a way approximately corresponding to the arrangement in FIG. 12 or FIG. 13.

The ventilating units which are located in the air-supply line and air-exit line are provided with reference numerals corresponding to the embodiment described above according to FIGS. 12 to 14.

The combination of the induction ventilation above the latent heat accumulator bodies and the utilization of the Koanda effect below the latent heat accumulator bodies, both by the incoming air, has a very significant influence on the heating/cooling output of such an arrangement with respect to a room of a building.

We claim:

1. A system for conditioning ambient air temperature in a room of a building, comprising:
   at least one latent heat accumulator body; and
   an air-supply line having an outlet positioned to induce, by incoming air from the air-supply line, a secondary flow of air originating from the room along and in thermal contact with the at least one latent heat accumulator body, and positioned to mix the secondary flow of air with the incoming air to bring the mixed air to a mixing temperature before the mix of the secondary flow of air and the incoming air flows into the room, wherein the air-supply line comprises a nozzle for accelerating the incoming air.

2. The system according to claim 1, wherein the nozzle comprises a funnel-shaped tapering portion.

3. The system according to claim 2, and further comprising a line continuation that surrounds the tapering portion, with a radial spacing.

4. The system according to claim 3, wherein the line continuation comprises inlet openings arranged to suck in ambient air from the room along the at least one latent heat accumulating body.

5. The system of claim 1, wherein the at least one latent heat accumulating body is plate-shaped.

6. The system of claim 1, wherein the air-supply line is arranged for the induced secondary flow to flow out into the incoming air.

7. The system of claim 1, wherein at least two latent heat accumulator bodies or rows of latent heat accumulator bodies are arranged above one another.

8. The system of claim 7, further comprising an incoming-air opening and a flap associated with the incoming-air opening so that a flow path between the at least two latent heat accumulator bodies or rows of latent heat accumulator bodies located above one another is closable by the flap.

* * * * *